(12) United States Patent
Malkin

(10) Patent No.: US 9,384,488 B2
(45) Date of Patent: Jul. 5, 2016

(54) SYSTEM AND METHODS FOR CREDENTIALING ON-LINE INFORMATION PROVIDERS

(75) Inventor: Wayne Malkin, Alberta (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1605 days.

(21) Appl. No.: 11/958,195

(22) Filed: Dec. 17, 2007

(65) Prior Publication Data

US 2009/0158405 A1 Jun. 18, 2009

(51) Int. Cl.
*G06F 17/00* (2006.01)
*G06Q 30/02* (2012.01)

(52) U.S. Cl.
CPC .................................. *G06Q 30/02* (2013.01)

(58) Field of Classification Search
CPC ...................................................... G06Q 30/02
USPC ............................................................ 726/5
See application file for complete search history.

(56) References Cited

U.S. PATENT DOCUMENTS

| | | | |
|---|---|---|---|
| 7,698,549 B2* | 4/2010 | Thornton et al. | 713/156 |
| 7,788,730 B2* | 8/2010 | Dean et al. | 726/30 |
| 2002/0059364 A1* | 5/2002 | Coulthard et al. | 709/203 |
| 2004/0150662 A1* | 8/2004 | Beigel | 345/707 |
| 2007/0180506 A1* | 8/2007 | Query | 726/5 |

* cited by examiner

*Primary Examiner* — Andrew Georgandellis
(74) *Attorney, Agent, or Firm* — Patterson + Sheridan, LLP

(57) ABSTRACT

A method of credentialing network-based sources of information, commentary, and opinion is provided. The method includes receiving a request for recognition, the request received by a credential clearinghouse (CCH) from at least one credential-granting organization (CGO), and, in response to the request for recognition, granting recognition to the CGO if the CGO is determined by the CCH to satisfy a predetermined standard of credibility. The method further includes, after the CGO is granted recognition, receiving from a user entity a request for a credential granted by the CGO, and granting the credential if the user entity is determined to satisfy a predetermined set of credentialing benchmarks. Additionally, the method includes posting on a publicly-accessible data communications network site an object comprising at least one among information content, commentary, and opinion, the object being associated with the user entity and including an indicator indicating the grant of the credential.

18 Claims, 3 Drawing Sheets

SYSTEM AND METHODS FOR CREDENTIALING ON-LINE INFORMATION PROVIDERS

FIELD OF THE INVENTION

The present invention is related to the field of network-based communications, and more particularly, to techniques for enhancing the integrity of sources of information exchanged through such communications.

BACKGROUND OF THE INVENTION

The advent and subsequent expansion of the Internet has tremendously expanded the opportunity of organizations and individuals to exchange ideas and information, widely disseminate knowledge generally, express opinions. With the Internet have come various new technologies for providing information and expressing opinions. On-line forums facilitate discussions on a broad range of topics.

At various Websites publicly-available Web logs, or "blogs,' can be accessed that typically provide information or commentary on various subjects. A blog can provide text and images, as well as links to other blogs or media related to a particular topic. A blog also can allow someone accessing the blog on-line to record comments in an interactive format, thereby gaining the opportunity to disseminate those comments to a wider audience when others visit the same. The community orientation of many such Websites is carried forward by so-called wikis. A wiki comprises computer software enabling a user to create, edit and link web pages. As such, wikis can be used to create collaborative websites. Wikis are also increasingly being installed by commercial and other organizations as a mechanism for providing affordable and effective Intranets.

Undoubtedly, the value of the exchange of information through the Internet—and, indeed, that of any open communication network—is strongly correlated with the accuracy and authenticity of the information provided. If erroneous information is widely disseminated before it can be verified to be inaccurate that value can be significantly eroded. So, too, when opinion masquerades as fact unless timely discovered to mere opinion, the value of open exchange can be adversely affected. A simple expression of opinion can be a valuable attribute of exchanges of information over the Internet. Without any mechanism for ascertaining the credentials of those expressing opinions, all opinions are weighted equally. An opinion about the entertainment value of a film or book in all likelihood deserves such treatment. Opinions about more weighty matters, however, such as the interpretation of an experimental result, or the value of various global warming strategies, could certainly be enhanced by understanding the basis of a particular individual's opinion or viewpoint. For example, the view or opinion of someone holding a PhD in physics from a recognized university, may in some contexts be may be more credible and hence deserving of more consideration than someone not holding such a credential.

The difficulty, however, is that to date there are few if any effective or efficient mechanisms by which consumers of network-based information can reliably determine the bona fides of a source of information supplied over an open network.

SUMMARY OF THE INVENTION

The present invention is directed to systems and methods for credentialing providers of on-line information. It is an object of the invention to identify the identity of sources of information disseminated on-line, and in particular to accurately identify the authors of works posted on and accessible through a communications network such as the Internet. It is a further object of the invention assess the credentials of such authors to thereby lend credibility to opinions expressed and information disseminated.

One embodiment of the invention is a system for credentialing network-based sources of information, commentary, and opinion. The system can include a data communications network site maintained by a credential clearinghouse (CCH) and defining a CCH network site. Additionally, the system can include a registry communicatively linked to the CCH network site for storing registry entries, each registry entry being associated with a credential-granting organization (CGO) determined by the CCH to satisfy a predetermined standard of credibility. The system can further include a database communicatively linked to the data communications network site for storing collections of CGO user-entity entries, each collection corresponding to a single CGO determined by the CCH to satisfy the predetermined standard of credibility and comprising at least one user-entity entry corresponding to a user entity granted a credential by the CGO.

Another embodiment of the invention is a method of credentialing network-based sources of information, commentary, and opinion. The method can include receiving a request for recognition, the request received by a credential clearinghouse (CCH) from at least one credential-granting organization (CGO), and, in response to the request for recognition, granting recognition to the CGO if the CGO is determined by the CCH to satisfy a predetermined standard of credibility. After the CGO is granted recognition, the method further can include receiving from a user entity a request for a credential granted by the CGO, and granting the credential if the user entity is determined to satisfy a predetermined set of credentialing benchmarks. The method also can include posting on a publicly-accessible data communications network site an object comprising at least one among information content, commentary, and opinion, the object being associated with the user entity and including an indicator indicating the grant of the credential.

Still another embodiment of the invention is a computer-readable storage medium in which computer-readable code can be embedded. When loaded to and executed by a computer, the computer-readable code can cause the computer to perform the following steps: receive a request for recognition at a data communications network site defining a credential clearinghouse (CCH) network site, the request received by a CCH from at least one credential-granting organization (CGO); in response to the request for recognition, register in a registry a grant of recognition to the CGO if the CGO is determined by the CCH to satisfy a predetermined standard of credibility; after the CGO is granted recognition, receive at the CCH network site a request for a credential granted by the CGO, the request received from a user entity; and convey to the user entity a credential if the user entity is determined to satisfy a predetermined set of credentialing benchmarks.

BRIEF DESCRIPTION OF THE DRAWINGS

There are shown in the drawings, embodiments which are presently preferred. It is expressly noted, however, that the invention is not limited to the precise arrangements and instrumentalities shown.

DETAILED DESCRIPTION

Figure 1:
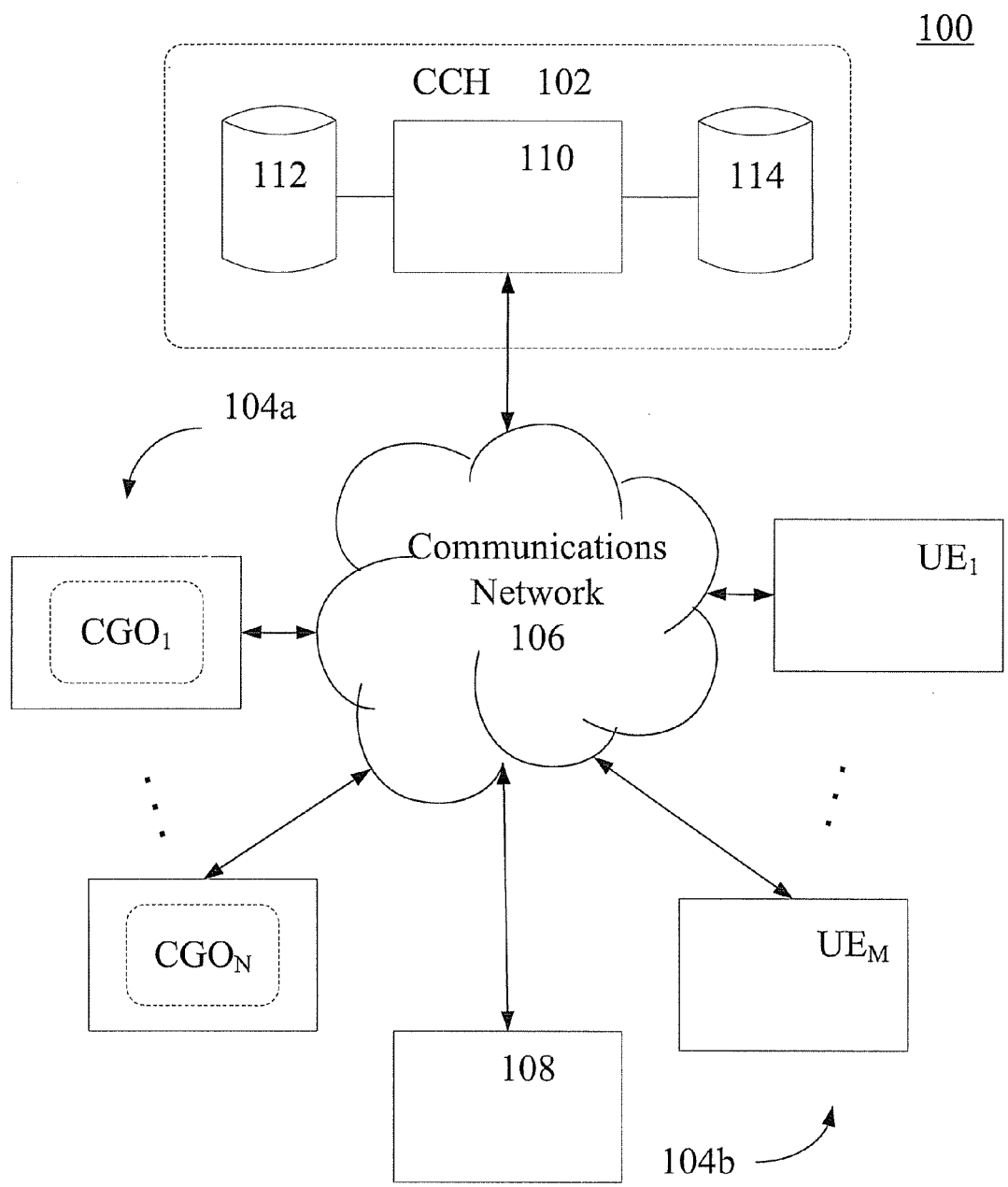
FIG. 1 is a schematic view of a system for credentialing network-based sources of information, commentary, and opinion, according to an embodiment of the invention.

FIG. 1 is a schematic view of an exemplary network environment 100 in which a system 102 for credentialing network-based sources of information, commentary, and opinion operates, according to one embodiment of the invention. The network environment 100 illustratively includes, in addition to the system 102, a plurality of network sites 104a, 104b. Illustratively, the system 102 and network (sites 104a, 104b are communicatively linked by one or more intermediate network nodes (not shown individually) comprising a data communications network 106, such as the Internet. It is noted, however, that in alternate embodiments one or more network sites 104a, 104b and/or the system 102 can be communicatively linked to one another.

One group of network sites 104a comprises one or more network sites, each of which corresponds to a particular credential-granting organization (CGO), illustratively shown as a set of N sites, $CGO_1, \ldots, CGO_N$. The other group of network sites 104b comprises one or more user-entity network sites, illustratively shown as a set of M sites, $UE_1, \ldots, UE_M$. A user-entity network site 104b can be any computer and/or communications device capable of exchanging data via the data communications network 106. Accordingly, each user-entity network site 104b enables a user entity, whether an individual or organization, to receive information content, commentaries, or opinions from another network-connected site, such as a Web server 108. Alternatively, or additionally, a user entity using a user-entity network site 104b can post information content, commentaries, or opinions on another network-connected site, such as the Web server 108.

The system 102 illustratively includes a data communications network site, defining a credential clearinghouse (CCH) network site 110 that is communicatively linked to the various other network sites 104a, 104b, 108. The CCH network site 110 can be implemented in any computing device, such as a server, for electronically processing data and exchanging data via the data communications network 106. Additionally, the system 102 includes a registry 112 and a user-entities database 114, illustratively linked communicatively to and through the CCH network site 110.

Performing the various processes and procedures described herein, the system 102 can function as a credential clearinghouse (CCH) for registering CGOs and handling credentials conferred by one or more of the CGOs. The system 102 permits various types of CGOs, such as professional, business and trade associations, universities, and other such bodies, to register with the CCH. When a particular CGO requests recognition as a recognized and reliable entity for conferring credentials pertaining to some subject matter, the CCH can assess the bona fides of the requesting CGO. The request, according to one embodiment, can be submitted to the CCH network site 110 via the data communications network 106. The assessment can involve network-based activities such as soliciting information through queries submitted via the data communications network 106 to one or more network-connected sources of information. Additionally, or alternatively, however, the assessment can involve one or more out-of-band processes. As used herein, an out-of-band process denotes any process that does not rely strictly on network-connected activities. Such out-of-band processes can include, for example, in-person interviews of recognized authorities in a particular field, telephone inquiries, and mailings requesting specific information. Through one or more network-based activities and/or one or more out-of-band processes, the assessment can be made of a CGO requesting recognition of its standing in some recognized field.

If the validity of a CGO's standing can be established, then the CCH can place the CGO in the registry 112. Accordingly, each entry in the registry 112 can be associated with a CGO determined by the CCH to satisfy a predetermined standard of credibility The system 102 further functions with respect to the conferring of a credential on a user entity by one or more registered CGOs. A user entity, as the term is used herein, includes any individual or group of individuals, whether grouped formally as an organization or not, who author and post on-line at a publicly-accessible network (site 108 an object comprising information content, commentary, and/or opinion. A user entity can request through the CCH a credential conferred by a particular CGO. In an alternative embodiment, however, the user entity can make a request for the credential without specifying a particular CGO, in which event the CCH can determine based-upon pre-established criteria the particular CGO that is best suited to determine whether a credential should be conferred on the user entity making the request.

Regardless, of the manner of selecting the particular CGO, it is the selected CGO that determines whether to grant the credential to the requesting user entity. According to one embodiment, the determination can be made by the system 102, wherein the CCH applies a set of credentialing benchmarks established by the particular CGO and confers the credential if those benchmarks are met. The determination can involve soliciting information that is to be conveyed by the requesting user entity. For example, if the user entity is an individual requesting that a university CGO, already registered with the CCH, confer the credential, then the user entity may be requested to provide certain information authenticating the user entity, such as the entity's social security number, mother's maiden name, registered classes, names of professors, grades conferred by the university, and/or other information. After an exchange of private data, if the bona fides of the requesting user entity are established according to the established benchmarks, then the credential can be conferred.

It is to be noted at this juncture, however, that identifying the author of a work by name, for example, is not a requirement of the invention. Since the credentialing process is a private exchange of information between the individual (requester) and an credential-granting entity (grantor), such as a professional body or institution, it is only necessary to track an underlying relationship. The individual's identity may or may not be disclosed when expressing an opinion, since some individual may prefer to only disclose their verified credentials while maintaining personal anonymity.

Figure 2:
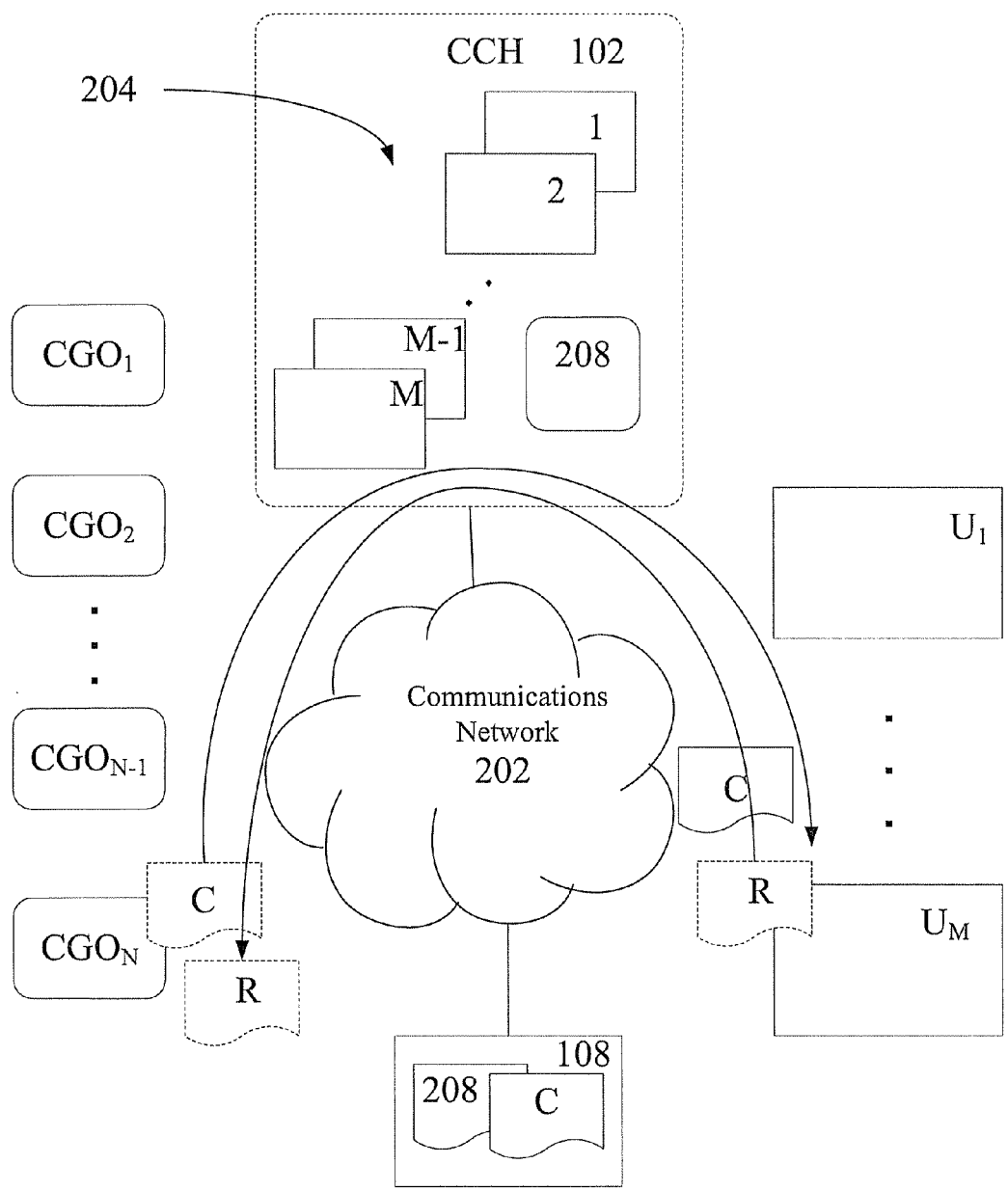
FIG. 2 is a schematic view of certain operative features of the system in FIG. 1.

Referring additionally now to FIG. 2, some of the operative features of the system 102, according to one embodiment, are schematically illustrated. These features are again described in the context of an exemplary network environment 200, in which various network sites illustratively communicate via a data communications network 202. Initially, a request, R, for credentialing can be submitted by a user entity, $UE_M$ to the CCH system 102, specifically, the network-connected CCH network site. If it is determined according to the above-described procedures, in which an established set of benchmarks are applied, that the credential can be granted, then a credential reference, C, is conveyed to the user entity $UE_M$ through the CCH system 102.

If and when the credential is conferred, a user-entity entry, M, optionally can be entered into the user-entities database 114. Specifically, the CCH system 102 can add the entry, M, to the exemplary 1, ..., M−1 entries already existing in the collection corresponding to the particular CGO granting the credential.

The credential reference, C, can comprise a credential reference in the form of a digital signature and/or a uniform resource locator (URL). The credential reference could be applied to an object of content 208 within the CCH system 102. A reference can be returned that can be packaged with the content 208. One or more options can be additionally provided, such as allowing an acceptance of the content and outputting new content packaged with the credential.

Thus, the credential reference, C, thus can be appended to or otherwise connected with an object containing the content 208, wherein the content can be information content, commentary, and/or opinion. The object comprising the now-credentialed content 208 can be posted at the publicly-accessible site communicatively 108 linked to the data communications network 202 by a user-entity that has been determined to satisfy the set of credentialing benchmarks.

If the credential reference, C, is a URL, the URL can link to the CCH network site 110. The CCH network site 110, when accessed, can provide an indicator indicating whether or not the object has been altered since being posted at the publicly-accessible site 108.

The system 102 allows user entities, such as individuals and groups, to apply their identity to existing on-line content as a way of expressing an opinion as to the veracity of the particular content. For example, an on-line encyclopedia can be integrated with the CCH system 102 so as to enable readers to tag content with their identity, and to provide under the now-verified identity a comment or opinion regarding the content. An accumulation of supporting opinions from highly-credentialed readers can enhance the value of on-line content. Moreover, a reader of on-line content can ascertain credential references associated with the content and follow a link to the CCH system 102. The reader can be notified of the result of the authentication process pertaining to the source of the content as well as informed about the now-authenticated credentials of the author of the content.

Figure 3:
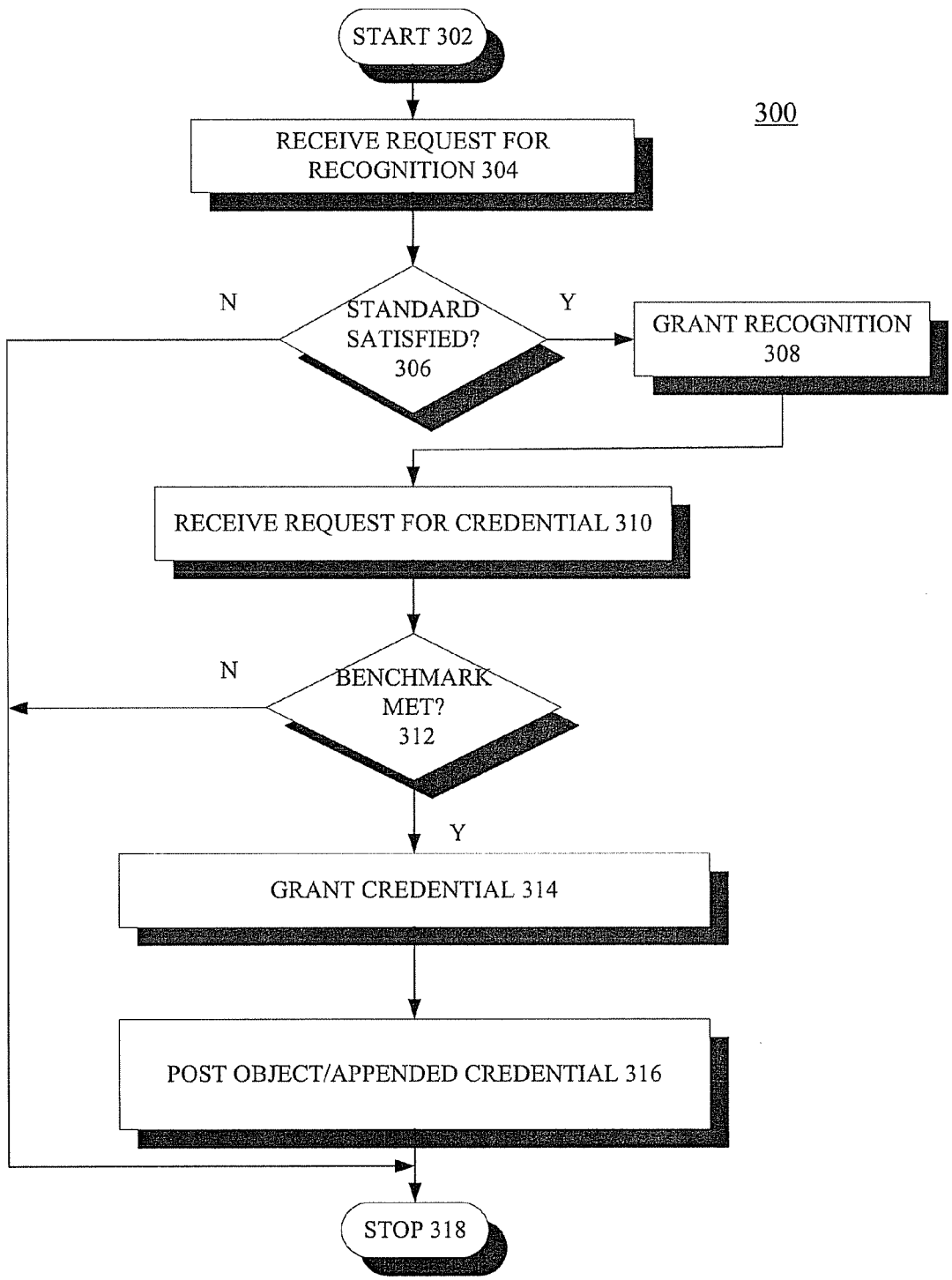
FIG. 3 is a flowchart of exemplary steps in a method of credentialing network-based sources of information, commentary, and opinion, according to another embodiment of the invention.

Certain method aspects of the invention are illustrated by the flowchart in FIG. 3. The flowchart corresponds to exemplary steps in a method 300 of credentialing network-based sources of information, commentary, and opinion, according to yet another embodiment of the invention. The method 300, after the start at step 302, includes receiving a request for recognition at step 304, the request being received by a credential clearinghouse (CCH) from at least one credential-granting organization (CGO). In response to the request for recognition, a determination can be made at step 306 for granting or not granting recognition. Recognition is granted at step 308 to the CGO if the CGO is determined by the CCH to satisfy a predetermined standard of credibility. Otherwise the method branches to 318, and the method concludes.

After a CGO is granted recognition, a request can be received at step 310 from a user entity requesting a credential from the CGO. A determination is made at step 312 as to whether the requesting user entity meets an established set of benchmarks. If the benchmarks are determined to be met, the credential is granted at step 314. Otherwise the method branches to 318 without the credential being conferred. If the credential is conferred, then at step 316 an object comprising information content, commentary, and/or opinion can be posted on a publicly-accessible data communications network site, the object being associated with the user entity and including an indicator indicating the grant of the credential. The method illustratively concludes at step 318.

The method 300 can further include maintaining a registry comprising entries identifying each credential-granting organization that has been determined to satisfy the predetermined standard of credibility. The method 300 also can include maintaining a database of user entity listings associated with the CGO, wherein each user entity listing corresponds to a user entity granted a credential by the CGO.

Additionally, the method 300 can include maintaining a publicly-accessible CCH site communicatively linked to the data communications network. Accordingly, the method 300 also can include receiving the request for recognition at the CCH through the data communications network. The method 300, additionally or alternative, can include the CGO granting the credential via the data communications network through the CCH. According to a particular embodiment, the method 300 can include receiving the request for the credential at the CCH site via the data communications network.

The method 300 further can include conveying via the data communications network to the user entity a digital signature associated with the CGO if the credential is granted by the CGO, wherein the digital signature can be appended to the object of information. The method 300 can include conveying via the data communications network to the user entity a credential reference associated with the CGO if the credential is granted by the CGO, wherein the credential reference can be appended to the object of information. The credential reference can comprise a uniform resource locator (URL). According to a particular embodiment, the URL can provide a link to the CCH, and the method 300 can thus include verifying that the object to which the credential reference is appended is in a form unaltered since a time when the object was posted when a reader links to the CCH through the URL.

Various techniques are contemplated for attaching a credential to on-line content once the bona fides of the author of the content have been ascertained and verified. According to one embodiment of the invention, a content publisher can manage the relationship of signature and content. Initially, a user-entity selects content to be marked with the credentials that have been conferred on the user-entity through the CCH. Subsequently, the content publisher requests credential verification from CCH, transmitting either a copy of the entire content or a cryptographic digest of same to CCH. The CCH can interact with the user-entity to sign in and apply credentials to the content. The CCH can respond to the content publisher with the results of the credentialing process, including a method of identifying the user to CCH and a digital signature as already described above. The content publisher can store the signature with the content and the identity of the user-entity.

At this point, the content publisher can query the CCH with the user-entity's identity to retrieve a description of that user-entity's credentials and ascertain how the user-entity prefers to be identified. This information, or any portion of it, can be displayed along with the user-entity's commentary, opinion, or other content authored by the user-entity. If a reader wishes to verify the user-entity's credentials, the content publisher is able to transmit the content and signature to the CCH for verification. Alternatively, the signature could be returned in a standard form such as an "XML Digital Signature," and the digesting method could be well documented. In particular, the content publisher could independently verify the signatures by digesting the content and user identity with a known algorithm.

According to another embodiment, the CCH can manage electronic signatures. Initially, the user-entity selects content to be marked with credentials conferred through the CCH to the user-entity. A content publisher can then request credential verification from the CCH, transmitting the corresponding content as described above. The CCH can interact with the user-entity, as also described above. The CCH stores the digital signature resulting in a database of applied credentials, and returns to the content publisher a reference to the digital signature. This reference, additionally or alternatively, could be in the form of a URL. The content publisher can store the reference with the content and an identity of the user-entity. If a reader wishes to verify the credentials of the user-entity, the content publisher can transmit the corresponding content with the reference to the CCH. Accordingly, the CCH can retrieve the digital signature from storage, verify the digital signature against the supplied content, and respond to the content publisher.

According to certain embodiments, only specific credentials are applied to a content object. In alternate embodiments, however, different relationships between content and credentials can exist. For example, a CGO can establish a relationship with the CCH and, as described, added to the CCH registry if the CGO establishes its bona fides (stringent authentication is required to create a trusted relationship). According to a different embodiment, a user-entity can establish a relationship with the CCH, wherein no authentication is required; the user-entity is minimally identified to the CCH through, for example, a login name and/or password. However, a more stringent authentication (more supporting documentation, for example, which is more closely scrutinized according to a predetermined set of criteria) could be provided, perhaps as an option, to increase the value of the user account. In still another embodiment, a user-entity's identity with a CGO and is granted credentials through the CCH (closely scrutinized authentication is required according to the desired level of trust imposed by the issuing CGO, the standards of trust being specified in the CCH by predetermined criteria so that readers understand the value of each credential.

When signing content of an information object, the signature applied to the content implicitly, or explicitly, promises that the credentialed user-entity is in fact the author of the content of the information object. This fact can be established through a sign-on process with the CCH. When a reader verifies the signature, the reader can see whatever personal identification is published for the author of the content, as well as all credentials that have been granted to the author.

In still other embodiments, the above-described process can be decentralized by having the CCH issue a certificate (e.g., digital signature) that embodies the user-entity's relationship with one or multiple CGOs. Once the certificate has been delivered to the user-entity, the CCH is no longer involved except as the issuer of the certificate. This approach, however, would preferably involve security safeguards such as is provided with a Public-Key-Infrastructure (PKI) approach pertaining to the underlying exchange of information and thus can be technically challenging given that revocation lists and other information typically must be maintained.

The invention, as already noted, can be realized in hardware, software, or a combination of hardware and software. The invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The invention, as also already noted, can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

The foregoing description of preferred embodiments of the invention have been presented for the purposes of illustration. The description is not intended to limit the invention to the precise forms disclosed. Indeed, modifications and variations will be readily apparent from the foregoing description. Accordingly, it is intended that the scope of the invention not be limited by the detailed description provided herein.

I claim:

1. A method of credentialing network-based sources of information, commentary, and opinion, the method comprising:

receiving a request for recognition, the request received by a credential clearinghouse (CCH) from at least one credential-granting organization (CGO), and, in response to the request for recognition, granting recognition to the CGO if the CGO is determined by the CCH to satisfy a predetermined standard of credibility;

after the CGO is granted recognition, receiving, from a user entity, a request for a credential granted by the CGO and granting the credential if the user entity is determined to satisfy a predetermined set of credentialing benchmarks and wherein the granted credential confirms an underlying relationship between the CGO and the user entity, without disclosing an identity of the user entity; and wherein, after granting the credential, the credential is attached to an object posted on a publicly-accessible data communications network site, the object comprising at least one among information content, commentary, and opinion, the credential including a first indicator indicating the grant of the credential to the user entity and indicating that the user entity is an author of the at least one of information content, commentary, or opinion, without disclosing an identity of the user entity, and the credential including a second indicator indicating whether the object has been altered since being posted at the publicly-accessible site and wherein the credential discloses that the user entity satisfied the predetermined set of credentialing benchmarks while maintaining personal anonymity of the user entity.

2. The method of claim 1, further comprising maintaining a registry comprising entries identifying each credential-granting organization that has been determined to satisfy the predetermined standard of credibility.

3. The method of claim 1, further comprising maintaining a database of user entity listings associated with the CGO, wherein each user entity listing corresponds to a user entity granted a credential by the CGO.

4. The method of claim 1, further comprising maintaining a publicly-accessible CCH site communicatively linked to the data communications network.

5. The method of claim 4, further comprising receiving the request for recognition at the CCH through the data communications network.

6. The method of claim 5, further comprising receiving the request for the credential at the CCH site via the data communications network.

7. The method of claim 5, further comprising conveying via the data communications network to the user entity a digital signature associated with the CGO, if the credential is granted by the CGO, wherein the digital signature can be attached to the object of information.

8. The method of claim 5, further comprising conveying via the data communications network to the user entity a credential reference associated with the CGO if the credential is granted by the CGO, wherein the credential reference can be attached to the object of information.

9. The method of claim 8, wherein the credential reference comprises a uniform resource locator (URL).

10. The method of claim 9, wherein the URL provides a link to the CCH, and further comprising verifying that the object to which the granted credential is attached is in a form unaltered since a time when the object was posted.

11. A system for credentialing network-based sources of information, commentary, and opinion, the system comprising:
 a data communications network site, the site maintained by a credential clearinghouse (CCH) and defining a CCH network site;
 a registry communicatively linked to the CCH network site for storing registry entries, each registry entry being associated with a credential-granting organization (CGO) determined by the CCH to satisfy a predetermined standard of credibility; and
 a database communicatively linked to the data communications network site and storing collections of CGO user-entity entries, each collection corresponding to a single CGO determined by the CCH to satisfy the predetermined standard of credibility and comprising at least one user-entity entry corresponding to a user entity granted a credential by the CGO, wherein the credential comprises a digital signature that can be attached to an object posted on a publicly-accessible site communicatively linked to the data communications network by a user-entity determined to satisfy the set of credentialing benchmarks, the object comprising one among information content, commentary, and opinion, the credential including a first indicator indicating the grant of the credential to the user entity and indicating that the user entity is an author of the at least one of information content, commentary, or opinion, without disclosing an identity of the user entity, and the credential including a second indicator indicating whether the object has been altered since being posted at the publicly-accessible site, and wherein the credential discloses that the user entity satisfied the predetermined set of credentialing benchmarks while maintaining personal anonymity of the user entity.

12. The system of claim 11, wherein the CCH network site is configured to receive via a data communications network to which the CCH network site is communicatively linked a request from a CGO requesting recognition that the requesting CGO satisfies the predetermined standard of credibility.

13. The system of claim 11, wherein the CCH network site is configured to transmit a credential to a user entity via a data communications network to which the CCH network site is communicatively linked, wherein the user entity is an entity determined to satisfy a predetermined set of credentialing benchmarks, and wherein the set of credentialing benchmarks is established by a CGO determined by the CCH to satisfy the predetermined standard of credibility.

14. The system of claim 13, wherein the credential comprises a uniform resource locator (URL) that can be attached to the object comprising the one among information content, commentary, and opinion, wherein the object is posted at the publicly-accessible site communicatively linked to the data communications network by a user-entity determined to satisfy the set of credentialing benchmarks.

15. The system of claim 14, wherein the URL links to the CCH network site, and wherein the CCH network site, when accessed, provides the second indicator indicating whether the object is unaltered since being posted at the publicly-accessible site.

16. A non-transitory computer-readable medium in which is embedded computer-readable code, which when loaded to and executed by a computer, causes the computer to:
 receive a request for recognition at a data communications network site defining a credential clearinghouse (CCH) network site, the request received by a CCH from at least one credential-granting organization (CGO);
 in response to the request for recognition, register in a registry a grant of recognition to the CGO if the CGO is determined by the CCH to satisfy a predetermined standard of credibility;
 after the CGO is granted recognition, receive, at the CCH network site a request for a credential granted by the CGO, the request received from a user entity; and
 convey to the user entity a credential if the user entity is determined to satisfy a predetermined set of credentialing benchmarks, wherein the granted credential confirms an underlying relationship between the CGO and the user entity, without disclosing an identity of the user entity; and
 wherein, after conveying the credential, the credential is attached to an object posted on a publicly-accessible data communications network site the object comprising at least one among information content, commentary, and opinion, the credential including a first indicator indicating the grant of the credential to the user entity and indicating that the user entity is an author of the at least one of information content, commentary, or opinion, without disclosing an identity of the user entity, and the credential including a second indicator indicating whether the object has been altered since being posted at the publicly-accessible site and wherein the credential discloses that the user entity satisfied the predetermined set of credentialing benchmarks while maintaining personal anonymity of the user entity.

17. The non-transitory computer-readable medium of claim 16, wherein the credential comprises a uniform resource locator (URL) for attaching to the object comprising one among information content, commentary, and opinion, wherein the object is posted at the publicly-accessible site communicatively linked to the data communications network by the user-entity determined to satisfy the set of credentialing benchmarks.

18. The non-transitory computer-readable medium of claim 17, wherein the URL links to the CCH network site, and further comprising computer-readable code for causing the computer to provide an indicator indicating whether the object is unaltered since being posted at the publicly accessible site.

* * * * *